(12) United States Patent
Dosdat et al.

(10) Patent No.: US 11,312,212 B2
(45) Date of Patent: Apr. 26, 2022

(54) PANEL FOR VEHICLE COMPRISING A COATED STEEL SHEET LOCALLY REINFORCED

(71) Applicant: ArcelorMittal, Luxembourg (LU)

(72) Inventors: Laurence Dosdat, Rozèrieulles (FR); Matthieu Amblard, Senlis (FR)

(73) Assignee: ArcelorMittal, Luxembourg (LU)

( * ) Notice: Subject to any disclaimer, the term of this patent is extended or adjusted under 35 U.S.C. 154(b) by 179 days.

(21) Appl. No.: 15/561,962

(22) PCT Filed: Mar. 22, 2016

(86) PCT No.: PCT/IB2016/000332
§ 371 (c)(1),
(2) Date: Sep. 26, 2017

(87) PCT Pub. No.: WO2016/156959
PCT Pub. Date: Oct. 6, 2016

(65) Prior Publication Data
US 2018/0118000 A1    May 3, 2018

(51) Int. Cl.
| | |
|---|---|
| *B60J 5/04* | (2006.01) |
| *C23C 2/26* | (2006.01) |
| *C22C 18/04* | (2006.01) |
| *C22C 18/00* | (2006.01) |
| *C23C 28/00* | (2006.01) |
| *C23C 30/00* | (2006.01) |
| *C23C 2/28* | (2006.01) |

(52) U.S. Cl.
CPC ........... *B60J 5/0425* (2013.01); *B60J 5/0443* (2013.01); *B60J 5/0452* (2013.01); *C22C 18/00* (2013.01); *C22C 18/04* (2013.01); *C23C 2/26* (2013.01); *C23C 28/3225* (2013.01); *C23C 28/34* (2013.01); *C23C 30/00* (2013.01); *C23C 2/28* (2013.01); *Y10T 428/12799* (2015.01)

(58) Field of Classification Search
None
See application file for complete search history.

(56) References Cited

U.S. PATENT DOCUMENTS

| | | | |
|---|---|---|---|
| 3,505,043 A | 4/1970 | Harvie et al. | |
| 4,399,174 A | 8/1983 | Kazunori et al. | |
| 6,537,674 B1 * | 3/2003 | Hamahara | B05D 7/51 106/14.05 |

(Continued)

FOREIGN PATENT DOCUMENTS

| | | |
|---|---|---|
| CN | 101029386 A | 9/2007 |
| CN | 102186941 A | 9/2011 |

(Continued)

OTHER PUBLICATIONS

Taylor, Brian, "Galvanized Scrap Enters the Mainstream", https://www.recyclingtoday.com/article/galvanized-scrap-enters-the-mainstream/, Aug. 4, 2001, accessed Oct. 23, 2019. (Year: 2001).*

(Continued)

*Primary Examiner* — Xiaobei Wang
(74) *Attorney, Agent, or Firm* — Davidson, Davidson & Kappel, LLC

(57) ABSTRACT

The present invention provides a panel for a vehicle including a coated steel sheet locally reinforced. A method for preparing the panel and the use of the panel are also provided.

36 Claims, 2 Drawing Sheets

(56) References Cited

U.S. PATENT DOCUMENTS

| | | | |
|---|---|---|---|
| 7,473,717 B2 | 1/2009 | Muenz et al. | |
| 7,767,314 B2 | 8/2010 | Kodana et al. | |
| 8,153,244 B2 | 4/2012 | Moren | |
| 8,721,809 B2 | 5/2014 | Vlot et al. | |
| 9,109,275 B2 | 8/2015 | Morimoto et al. | |
| 2005/0166532 A1* | 8/2005 | Barz | B62D 27/026 52/846 |
| 2010/0024925 A1* | 2/2010 | Warnecke | C23C 2/06 148/533 |
| 2010/0139816 A1* | 6/2010 | Hanlon | C22C 18/02 148/526 |
| 2013/0153142 A1 | 6/2013 | Kawaguchi et al. | |
| 2015/0101193 A1* | 4/2015 | Schurter | B60J 5/0483 29/897.2 |
| 2015/0191077 A1 | 7/2015 | Allely et al. | |
| 2015/0352825 A1 | 12/2015 | Richard et al. | |
| 2016/0355631 A1* | 12/2016 | Xu | C08J 3/24 |

FOREIGN PATENT DOCUMENTS

| | | | |
|---|---|---|---|
| CN | 104364412 A | | 2/2015 |
| CN | 104805429 A | | 7/2015 |
| JP | S60222240 A | | 11/1985 |
| JP | S6363775 A | | 3/1988 |
| JP | H08267665 A | | 10/1996 |
| JP | 2000064010 A | | 2/2000 |
| JP | 2005513226 A | | 5/2005 |
| JP | 2006241495 A | | 9/2006 |
| JP | 2007118077 A | | 5/2007 |
| JP | 2008504440 A | | 2/2008 |
| JP | 2009120947 | * | 6/2009 |
| JP | 2010100897 A | | 5/2010 |
| JP | 2012056112 A | | 3/2012 |
| KR | 20110069163 A | | 6/2011 |
| RU | 2469102 C2 | | 12/2012 |
| RU | 2510423 C2 | | 3/2014 |
| WO | WO2009/095264 | * | 8/2009 |
| WO | 2014184599 A1 | | 11/2014 |

OTHER PUBLICATIONS

"Nitohard Series Structural Reinforcement Patch", Product Data Sheet, 2011.

Arcelormittal, "Zagnelis (TM)—Double-sided ZnMgAl galvanized steels", Extract from Product Catalog, May 7, 2013.

N. Lebozec et al, "Corrosion performance of Zn—Mg—Al coated steel in accelerated corrosion tests used in the automative industry and field exposures", Materials and Corrosion/Werkstoffe und Korrosion, Mar. 11, 2013, pp. 969-978, vol. 64, No. 11.

Margot Vlot et al, "Magizinc (ZnAlMg) Coatings versus galvannealed Authors Magizing (ZnAlMg) Coatings Versus Galvannealed", May 4, 2011.

"Bake-hardening steels BHZ", Jun. 1, 2013.

General Motors Worldwide: "GMW15286—Flexible Reinforcement Patch", Jan. 1, 2014 (Jan. 1, 2014 ), Retrieved from the Internet: URL:http://standards.globalspec.com/std/1659745/gmw15286 [retrieved on Mar. 17, 2017].

Nitta Europe: "Reinforcing Material NITOHARD RE-2000", Jan. 1, 2013 (Jan. 1, 2013 ), Retrieved from the Internet: URL:https://www.nitto.com/eu/en/products/group/sealing/nitohard/009/ [retrieved on May 19, 2017].

* cited by examiner

PANEL FOR VEHICLE COMPRISING A COATED STEEL SHEET LOCALLY REINFORCED

The present invention relates to a panel for vehicle comprising a coated steel sheet, said steel sheet being locally reinforced by a patch. The invention is particularly well suited for the manufacture of parts of automotive vehicles.

BACKGROUND

With a view of saving the weight of vehicles, it is known to reinforce locally steel sheets by adding a patch. Thus, the weight of the steel sheet, i.e, the thickness, decreases and the local addition of a patch allows for a high strength. The steel sheets are generally coated with a metal coating. Then, the panels comprising the coated steel sheet are painted. However, in practice, it was observed that the known metallic coatings may be prone to delamination issues of paint layers around the patch.

Indeed, water infiltrates between paint layers, for example e-coating layer, and the edges of the patch. Thus, corrosion products are formed under the paint player resulting in the delamination of paint layers around the patch.

SUMMARY OF THE INVENTION

An object of the present invention is to provide a panel for vehicle locally reinforced with at least one patch which does not have delamination issues around the patch.

The present invention provides a locally reinforced panel for a vehicle comprising a steel sheet having one outer face and one inner face, wherein at least the inner face is coated with a coating comprising from 1.0 to 6.0% by weight of aluminum, from 0.5 to 5.0% by weight of magnesium, the balance being zinc and optionally impurities and optionally additional elements chosen from Si, Sb, Pb, Ti, Ca, Mn, Sn, La, Ce, Cr, Zr or Bi, the content by weight of each additional element being less than 0.3% by weight. The sheet is locally reinforced by at least one patch bound to the inner face.

The panel may also comprise the following characteristics:
 the coating comprises from 1.0 to 1.4% by weight of aluminum, from 1.0 to 1.4% by weight of magnesium, the balance being zinc and optionally impurities and optionally additional elements chosen from Si, Sb, Pb, Ti, Ca, Mn, Sn, La, Ce, Cr, Zr or Bi, the content by weight of each additional element being less than 0.3% by weight;
 the coating comprises from 3.5 to 3.9% by weight of aluminum, from 2.3 to 3.3% by weight of magnesium, the balance being zinc and optionally impurities and optionally additional elements chosen from Si, Sb, Pb, Ti, Ca, Mn, Sn, La, Ce, Cr, Zr or Bi, the content by weight of each additional element being less than 0.3% by weight;
 the patch comprises a resin layer and an inorganic material layer, the resin layer being in contact with the coating of the inner face;
 the resin layer includes a Young's modulus between 1 and 200 MPa and the inorganic layer has a Young's modulus between 1 and 15 GPa;
 the inorganic material layer is made of glass fiber and said resin layer is a foam material;
 the resin layer is an epoxy-rubber based material;
 the resin layer comprises a glue;
 the outer face and inner face further comprise a phosphate layer and an e-coating layer around the patch;
 the panel being a dash panel, an interior door panel, an exterior door panel, a roof panel, a wheel arch, a vehicle floor, an interior hood panel, an exterior hood panel, a fender or a body side of a vehicle;
 the steel sheet has a thickness between 0.4 to 1.0 mm; and
 the steel sheet has a thickness between 0.5 to 0.7 mm.

Another object of the present invention provides a process for preparing a panel for vehicle comprising the following steps:
 A) the provision of a steel sheet having at least the inner face coated with a coating comprising from 1.0 to 6.0% by weight of aluminum, from 0.5 to 5.0% by weight of magnesium, the balance being zinc and optionally impurities and optionally additional elements chosen from Si, Sb, Pb, Ti, Ca, Mn, Sn, La, Ce, Cr, Zr or Bi, the content by weight of each additional element being inferior to 0.3% by weight,
 B) the application of at least one patch onto the coated steel sheet obtained from step A) and
 C) the stamping, said stamping being before or after step B).

The process can also comprise the following characteristics:
 further comprising D) a phosphating step and E) an e-coating step;
 the coated steel sheet is cut before or after step B) or before, during or after step C);
 during step B), the patch is stuck on the coated sheet;
 step E) is performed in an oven at a temperature between 160 and 180° C. during 20 to 35 minutes. The present invention further provides use of the panel for the manufacture of a part of an automotive.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

In all figures, the layer thickness shown is given by way of illustration and cannot be considered as a scale representation of the layers.

DETAILED DESCRIPTION

The following terms will be defined:
E-coating includes electrophoretic coating and electrophoretic painting deposition.

Figure 1:
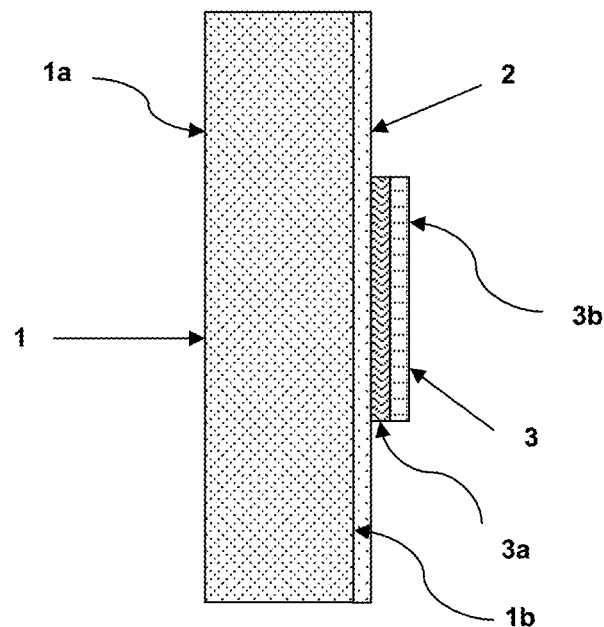
FIG. 1 is a schematic representation of one embodiment according to the invention.

The invention relates to a panel for vehicle comprising a steel sheet 1 having one outer face 1a and one inner face 1b. FIG. 1 shows one embodiment wherein the inner face is coated with a coating 2 comprising from 1.0 to 6.0% by weight of aluminum, from 0.5 to 5.0% by weight of magnesium, preferably from 1.0 to 5.0% by weight of magnesium, the balance being zinc and optionally impurities and optionally additional elements chosen from Si, Sb, Pb, Ti, Ca, Mn, Sn, La, Ce, Cr, Zr or Bi, the content by weight of each additional element being inferior to 0.3% by weight, said sheet being locally reinforced by at least one patch 3 bound to said inner face 1b. Preferably, the coating according to the invention is deposited on the inner face and the outer face of the steel sheet.

Advantageously, the coating comprises from 1.0 to 1.4% by weight of aluminum, from 1.0 to 1.4% by weight of magnesium, the balance being zinc.

In another preferred embodiment, the coating comprises from 3.5 to 3.9% by weight of aluminum, from 2.3 to 3.3% by weight of magnesium, the balance being zinc.

The coating can be deposited by any methods known to the man skilled in the art, for example hot-dip galvanization process. In this process, the steel sheet for example obtained by hot and cold rolling is dipped in a molten metal bath.

The bath comprises zinc, magnesium and aluminum. It can comprise additional elements chosen from Si, Sb, Pb, Ti, Ca, Mn, Sn, La, Ce, Cr, Zr or Bi. These additional elements can improve among others ductility, coating adhesion on the steel sheet. The bath can also contain impurities from feeding ingots or from the passage of the steel sheet in the molten bath, such as iron with a content up to 0.5% by weight, and usually between 0.1 et 0.4% by weight.

The bath temperature is between 360 and 480° C., preferably 420 and 460° C. The thickness of the coating is usually inferior or equal to 25 µm.

After the deposition of the coating, the steel sheet is for example wiped with nozzles ejecting gas on both sides of the coated steel sheet. The coated steel sheet is then cooled. When only the inner face is coated, a brushing is realized to take off the coating deposited on the outer face.

Preferably, the cooling rate is superior or equal to 15° $C.\cdot s^{-1}$ between the beginning of the solidification and the end of the solidification. Advantageously, the cooling rate between the beginning and the end of the solidification is superior or equal to 20° $C.\cdot s^{-1}$.

Then, a skin-pass can be realized and allows work hardening the coated steel sheet and giving it a roughness facilitating the subsequent shaping. A degreasing and a surface treatment can be applied in order to improve for example adhesive bonding or corrosion resistance.

The coated steel sheet is then cut. In other embodiments, the coated steel sheet is cut after the application of the patch or before, during or after the stamping.

According to the invention, the panel, comprising the coated steel sheet, is such that the steel sheet is locally reinforced by at least one patch bound to the inner face of the steel sheet. For example, the patch can comprise a resin layer 3a and an inorganic material layer 3b, said resin layer being in contact with the coating of the inner face.

Preferably, the inorganic material is made of glass fiber. The resin layer is preferably a foam material, for example an epoxy-rubber based material. In one preferred embodiment, the epoxy-rubber based material plays the role of glue. In another preferred material, the resin layer comprises a glue. For example the glue is an epoxy glue, an elastomeric adhesive, a butyl rubber glue or an acrylic resin. Thus, the patch is preferably stuck on the inner face of the steel sheet in order to locally reinforce the sheet. For example, the patch is Nitohard®.

In a preferred embodiment, the resin layer has a Young's modulus between 1 and 200 MPa and the inorganic layer has a Young's modulus between 1 and 15 GPa. Without wishing to be bound by any theory, it has been found that when Young's moduli are superior to these values, there is a greater risk that the patch creates a surface defect. When Young's moduli are inferior to these values, there is a risk that the reinforcement strength of the patch decreases.

In another embodiment, the patch comprises a resin layer, preferably a foam material, said resin layer being reinforced by an inorganic material. For example, the inorganic material is made of glass fiber or carbon fiber.

A stamping of the panel is realized before or after the bonding of the patch. Preferably, the stamping is realized before by any methods known to the man skilled in the art, for example for the outer panel.

Figure 2:
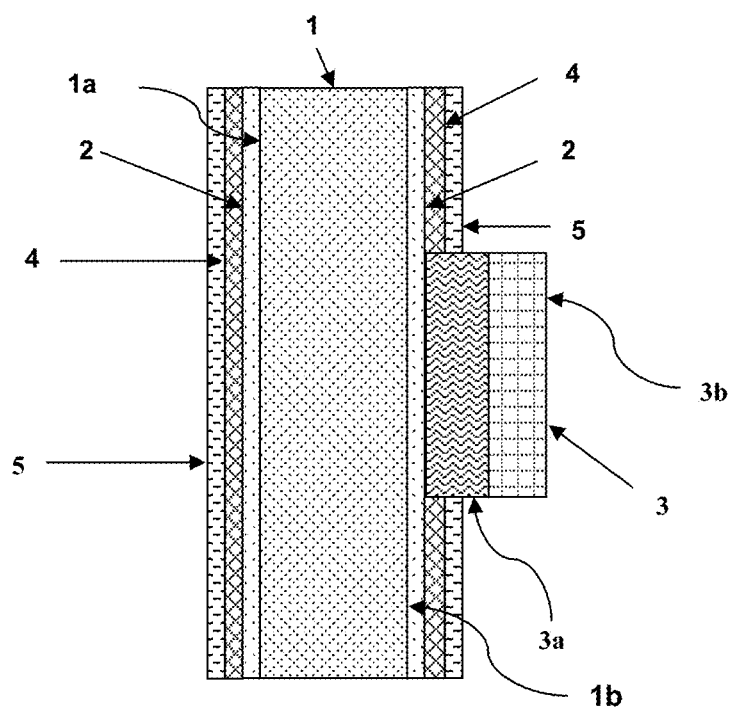
FIG. 2 is a schematic representation of another embodiment according to the invention.

FIG. 2 illustrates a panel according to the invention having a phosphate layer 4 and an e-coating layer 5 around the patch, said panel comprising a steel sheet coated with the coating according to the invention on both faces. To this end, a phosphating step and an e-coating step are successively realized. Preferably, the patch is free of phosphate and e-coating layers, i.e. there are no phosphate and no e-coating layers above it.

The phosphating, which improves the paint adhesion, is realized by any method known to the man skilled in the art. Usually, the thickness of the phosphate layer is between 1 and 2 µm.

The e-coating step is realized by dipping the panel into a bath comprising for example an aqueous solution comprising Pigment Paste® W9712-N6 and Resin Blend® W7911-N6 from PPG Industries during 120 to 180 seconds at a temperature between 28 and 35° C. The pH of the solution is preferably between 5.5 and 5.8. A voltage between 200 and 320V is applied. Then, the panel is wiped and cured in the oven at a temperature between 160 and 180° C. during 20 to 35 minutes. During the curing, the resin layer of the patch is foamed and hardened. Usually, the thickness of the e-coating layer is between 15 and 25 µm, preferably inferior or equal to 20 µm.

After the e-coating step, other paint layers can be deposited, for example, a primer coat of paint, a basecoat layer and a top coat layer.

A panel locally reinforced comprising a coated steel sheet according to the invention is thus obtained. The weight saving is huge since it allows for a panel wherein the steel sheet has for example a thickness between 0.4 to 1.0 mm, preferably 0.5 to 0.7 mm.

The panel according to the invention can be a dash panel, an interior door panel, an exterior door panel, a roof panel, a wheel arch, a vehicle floor, an interior hood panel, an exterior hood panel, a fender or a body side of a vehicle.

Figure 3:
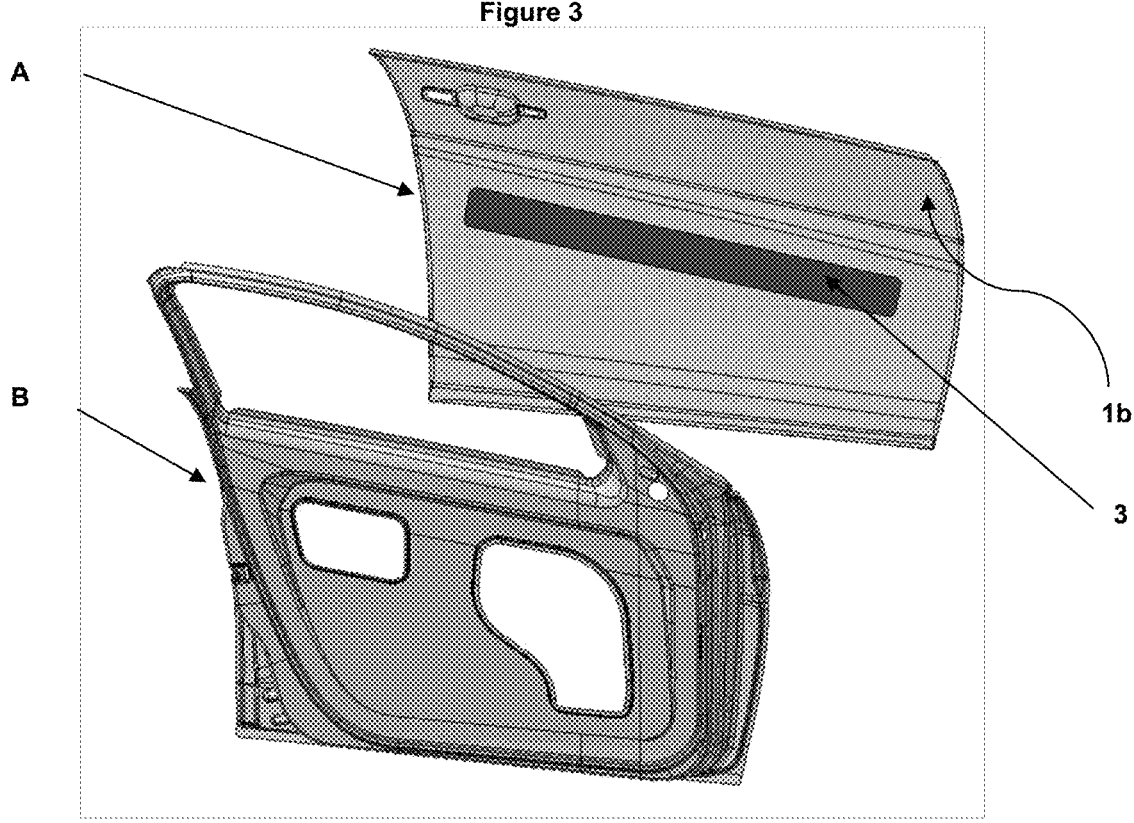
FIG. 3 is a schematic representation of a door of a vehicle according to the invention.

FIG. 3 illustrates a door of vehicle comprising an exterior door panel A and an interior door panel B. The exterior door panel comprising a coated steel sheet is locally reinforced with a patch 3 according to the present invention. The interior door panel can be coated with a coating according to the invention or a zinc coating. Zinc coating can be deposited by any method known to the man skilled in the art, for example by hot-dip galvanization process or electrogalvanization.

The door panel is a part of the vehicle very subjected to delamination issues of paint layers around the patch. Indeed, water present on the vehicle glass infiltrates inside of the door, i.e. between the interior and exterior door panel. In contrary to known metallic coatings, the panel according to the invention allows for a high resistance to delamination around the patch.

Additionally, there is an important risk that the patch creates a surface defect on a coated panel due to the weak thickness of the panel. Specifically in the case of outer panel, users can realized a test consisting in viewing the panel in a neon room in order to verify the quality of the surface aspect.

To this end, the panel can be covered with an oil film to increase its reflectivity, and is placed under a ramp of parallel neon lights. The surface defects are well highlighted by irregularities of reflection of light strips.

With a panel according to the present invention, there is a good surface aspect, i.e. no surface defect even under neon lights, which is an important criteria for users.

The invention will now be explained in trials carried out for information only. They are not limiting.

EXAMPLES

For all trials, steel sheets used are 180BH® and IF220®. The composition of the steel 180BH® is as follows:

C=0.0016%, S=0.011%, N=0.0025%, Mn=0.2%, P=0.014%, Si=0.044%, Cu=0.033%, Ni=0.015%, Cr=0.026%, Al=0.032%, As=0.002%, Mo=0.004%, V=0.002%, Sn=0.0025%, Nb=0.007%, Ti=0.001%, B=0.0028%, Zr<0.003%.

Panel according to the present invention and various panels were prepared and subjected to a delamination test.

Trials 1, 2 and 3 are panels according to the present invention. These panels comprise steel sheets coated with a coating comprising 3.7% by weight of aluminum and 3% by weight of magnesium, the balance being zinc. In trials 1, 2 and 3, the thickness of the coating is respectively of 6 μm, 7.5 μm and 10 μm. The coating was deposited by hot-dip galvanization process.

Trial 4 is a comparative panel comprising a steel sheet coated with a zinc coating. The zinc coating, having a thickness of 7.5 μm, was deposited by hot dip galvanization process.

Trial 5 is another comparative panel comprising a steel sheet coated with a zinc coating. The zinc coating, having a thickness of 7.5 μm, was deposited by electrogalvanization process.

For all trials, the coated steel sheet was cut and then stamped. After, a patch Nitohard® RE-2000 was stuck onto the coated steel sheet. It was followed by a phosphating step realized by dipping into a bath comprising a solution of Gardobond® 24 TA, Gardobond® Add H7141, Gardobond® H7102, Gardobond® Add H7257, Gardobond® Add H7101, Gardobond® Add H7155 during 3 minutes at 50° C. The panel was then wiped with water and dried with hot air.

An e-coating layer of 20 μm was deposited the phosphate layer. To this end, all trials were dipped into a bath comprising an aqueous solution comprising Pigment Paste® W9712-N6 and Resin Blend® W9711-N6 of PPG Industries during 180 seconds at 30° C. A 200V voltage was applied. Then, the panel was wiped and cured in the oven at 180° C. during 35 minutes.

Figure 4:
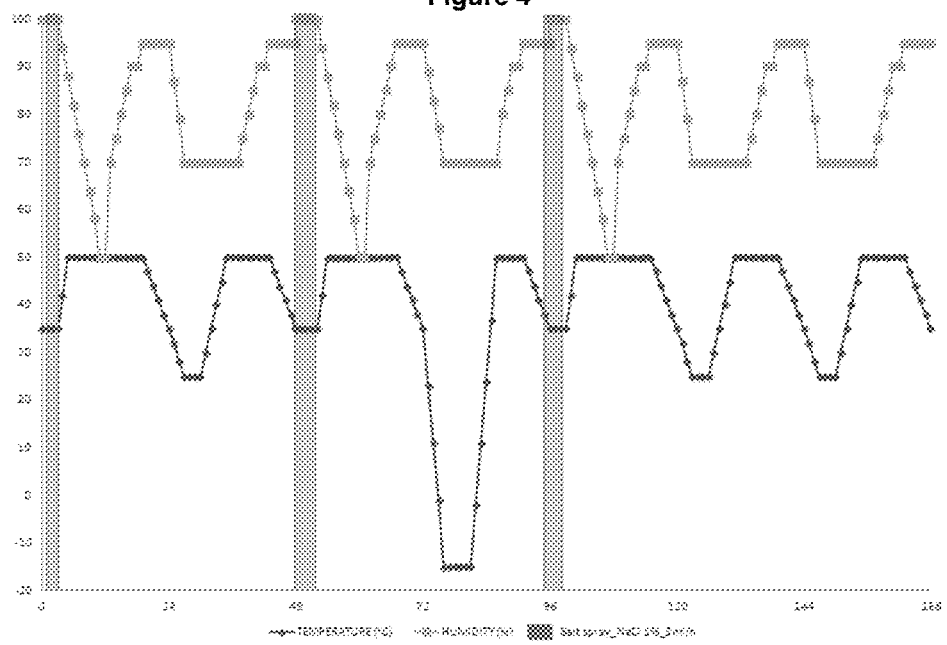
FIG. 4 illustrates test results for one corrosion cycle corresponding to 168 hours.

A test, consisting in submitting panels to corrosion cycles according to the norm VDA 233-102, was then realized. Trials were put in a chamber wherein an aqueous solution of sodium chloride of 1% by weight was vaporized on trials with a rate of flow of 3 mL·h$^{-1}$. The temperature varied from 50 to −15° C. and the humidity rate varied from 50 to 100%. FIG. 4 illustrates one cycle corresponding to 168 hours, i.e. one week.

The presence of delamination around the patch was observed by naked eyes: 0 means excellent, in other words, there is little or no delamination around the patch and 5 means very bad, in other words, there are lots of delamination around the patch.

| Trial | 1 | 2 | 3 | 4 | 5 |
| --- | --- | --- | --- | --- | --- |
| Coating | Zn3.7Al3Mg 6 μm | Zn3.7Al3Mg 7.5 μm | Zn3.7Al3Mg 10 μm | Zn 7.5 μm | Zn 7.5 μm |
| Steel sheet | 180BH® | IF220® | IF220® | 180BH® | 180BH® |
| Process of coating | Hot-dip galvanization | Hot-dip galvanization | Hot-dip galvanization | Hot-dip galvanization | Electro galvanization |
| Delamination After 12 weeks | — | — | 0 | 1.5 | 1.5 |
| Delamination After 21 weeks | 0.5 | 0 | 0 | 3.5 | 3 |
| Delamination After 25 weeks | 1 | 0.5 | 0.5 | 5 | 5 |

The panel according to the invention leads to no or little delamination around the patch, even after 25 weeks of corrosion cycle, in contrary to the panel comprising a zinc coated steel sheet.

What is claimed is:

1. A panel for a vehicle comprising:
a steel sheet having an outer face and an inner face;
at least the inner face being coated with a coating the coating consisting of
from 3.5 to 6.0% by weight of aluminum,
from 2.3 to 5.0% by weight of magnesium,
optionally at least one additional element chosen from Si, Sb, Pb, Ti, Ca, Mn, Sn, La, Ce, Cr, Zr or Bi, a content by weight of each additional element being inferior to 0.3% by weight, and
a balance of the coating being zinc and optionally impurities; and
at least one patch bound to the coated inner face locally reinforcing the sheet; the patch including a resin layer contacting the coating of the coated inner face and an inorganic material including glass fiber or carbon fiber to locally reinforce the sheet;
the panel being a dash panel; an interior door panel, an exterior door panel, a roof panel, a wheel arch, a vehicle floor, an interior hood panel, or an exterior hood panel of the vehicle;
wherein the outer face and inner face further comprise a phosphate layer and an e-coating layer, wherein on the inner face: the phosphate layer and e-coating layer are around the at least one patch, the phosphate layer and e-coating layer are not between the coated inner face and the at least one patch, and the phosphate layer and e-coating layer are not over the at least one patch.

2. The panel according to claim 1 wherein the coating includes the at least one additional element chosen from Si, Sb, Pb, Ti, Ca, Mn, Sn, La, Ce, Cr, Zr or Bi.

3. The panel according to claim 1, wherein said aluminum in said coating is present in an amount from 3.5 to 3.9% by weight, and said magnesium in said coating is present in an amount from 2.3 to 3.3% by weight.

4. The panel according to claim 3, wherein the coating further includes said at least one additional elements chosen from Si, Sb, Pb, Ti, Ca, Mn, Sn, La, Ce, Cr, Zr or Bi.

5. The panel according to claim 1, wherein the at least one patch comprises the resin layer and an inorganic material layer including the inorganic material.

6. The panel according to claim 5, wherein the resin layer has a Young's modulus between 1 and 200 MPa and the inorganic layer has a Young's modulus between 1 and 15 GPa.

7. The panel according claim 5, wherein the inorganic material layer is made of the glass fiber and the resin layer is a foam material.

8. The panel according to claim 7, wherein the resin layer is an epoxy-rubber based material.

9. The panel according to claim 5, wherein the resin layer comprises a glue.

10. The panel according to claim 1, wherein the steel sheet has a thickness between 0.4 to 1.0 mm.

11. The panel according to claim 1, wherein the steel sheet has a thickness between 0.5 to 0.7 mm.

12. A method for preparing a panel for a vehicle comprising the following steps:
    A) providing a steel sheet having at least an inner face coated with a coating consisting of: from 3.5 to 6.0% by weight of aluminum, from 2.3 to 5.0% by weight of magnesium, and optionally at least one additional element chosen from Si, Sb, Pb, Ti, Ca, Mn, Sn, La, Ce, Cr, Zr or Bi, a content by weight of each additional element being inferior to 0.3% by weight, a balance of the coating being zinc and optionally impurities;
    B) applying at least one patch onto the coated inner face of the steel sheet obtained from step A); and
    C) stamping, the stamping being before or after step B);
    D) applying a phosphate layer around the at least one patch, wherein the phosphate layer is not between the coated inner face and the at least one patch and the phosphate layer is not over the at least one patch;
    E) applying an e-coating over the phosphate layer, wherein the e-coating layer is not between the coated inner face and the at least one patch and the e-coating layer is not over the at least one patch;
    the patch including a resin layer contacting the coating of the coated inner face and an inorganic material including glass fiber or carbon fiber to locally reinforce the sheet;
    the panel being a dash panel, an interior door panel, an exterior door panel, a roof panel, a wheel arch, a vehicle floor, an interior hood panel, or an exterior hood panel of the vehicle.

13. The method as recited in claim 12, wherein the coating includes said at least one additional element chosen from Si, Sb, Pb, Ti, Ca, Mn, Sn, La, Ce, Cr, Zr or Bi.

14. The method according to claim 12, further comprising the step of cutting the coated steel sheet before or after step B) or before, during or after step C).

15. The method according to claim 12, wherein during step B), the patch is stuck on the coated steel sheet.

16. The method according to claim 12, wherein the step E) is performed in an oven at a temperature between 160 and 180° C. for 20 to 35 minutes.

17. A method of manufacturing a part of an automotive vehicle comprising the step of:
    providing the panel according to claim 1; and
    forming the panel into the part.

18. A method of manufacturing a part of an automotive vehicle comprising the step of:
    providing the panel prepared according to claim 12; and
    forming the panel into the part.

19. A part for an automotive vehicle comprising:
    the panel made by the method of claim 12.

20. The panel according to claim 1, the panel being the exterior door panel.

21. The method according to claim 16, wherein the resin layer of the patch is foamed during step E).

22. A panel for vehicle comprising:
    a steel sheet having an outer face and an inner face;
    at least the inner face being coated with a coating consisting of from 3.5 to 3.9% by weight of aluminum, from 2.3 to 3.3% by weight of magnesium, and optionally at least one additional element chosen from Si, Sb, Pb, Ti, Ca, Mn, Sn, La, Ce, Cr, Zr or Bi, a content by weight of each additional element being inferior to 0.3% by weight, a balance of the coating being zinc and optionally impurities;
    at least one patch bound to the coated inner face locally reinforcing the steel sheet, the patch comprising a resin layer and an inorganic material layer, the resin layer being in contact with the coating of the inner face and the resin layer being an epoxy-rubber based material and wherein the outer face and the inner face further comprise a phosphate layer and an electrophoretic coating layer around the patch, wherein the phosphate layer and electrophoretic coating layer are not between the coated inner face and the at least one patch, and the phosphate layer and electrophoretic coating layer are not over the at least one patch.

23. The panel according to claim 22, wherein the resin layer has a Young's modulus between 1 and 200 MPa and the inorganic layer has a Young's modulus between 1 and 15 GPa.

24. The panel according to claim 22, wherein the inorganic material layer is made of glass fiber and the resin layer is a foam material.

25. The panel according to claim 22, wherein the resin layer comprises a glue.

26. The panel according to claim 22, wherein the panel is a dash panel, an interior door panel, an exterior door panel, a roof panel, a wheel arch, a vehicle floor, an interior hood panel, an exterior hood panel, a fender or a body side of a vehicle.

27. The panel according to claim 22, wherein the steel sheet has a thickness between 0.4 to 1.0 mm.

28. The panel according to claim 22, wherein the steel sheet has a thickness between 0.5 to 0.7 mm.

29. A method for preparing a panel for vehicle comprising the following steps:
    A) providing a steel sheet having an inner face coated with a coating consisting of from 3.5 to 6.0% by weight of aluminum, from 2.3 to 5.0% by weight of magnesium, and optionally at least one additional element chosen from Si, Sb, Pb, Ti, Ca, Mn, Sn, La, Ce, Cr, Zr or Bi, a content by weight of each additional element being inferior to 0.3% by weight, a balance being zinc and optionally impurities;
    B) applying at least one patch onto the coated steel sheet obtained from step A);
    C) stamping, the stamping being before or after step B);
    D) applying a phosphate layer around the at least one patch, wherein the phosphate layer is not between the coated inner face and the at least one patch and the phosphate layer is not over the at least one patch;

E) applying an e-coating over the phosphate layer, wherein the e-coating layer is not between the coated inner face and the at least one patch and the e-coating layer is not over the at least one patch.

30. The method according to claim 29, wherein the coated steel sheet is cut before or after step B) or before, during or after step C).

31. The method according to claim 29, wherein during step B), the patch is stuck on the coated sheet.

32. The method according to claim 29, wherein the step E) is performed in an oven at a temperature between 160 and 180° C. for 20 to 35 minutes.

33. The method according to claim 29, wherein the stamping is after step B).

34. A part for an automotive vehicle comprising:
the panel made by the method of claim 29.

35. The method according to claim 12, wherein said aluminum in said coating is present in an amount from 3.5 to 3.9% by weight, and said magnesium in said coating is present in an amount from 2.3 to 3.3% by weight.

36. The method according to claim 29, wherein said aluminum in said coating is present in an amount from 3.5 to 3.9% by weight, and said magnesium in said coating is present in an amount from 2.3 to 3.3% by weight.

\* \* \* \* \*